Figure 1:
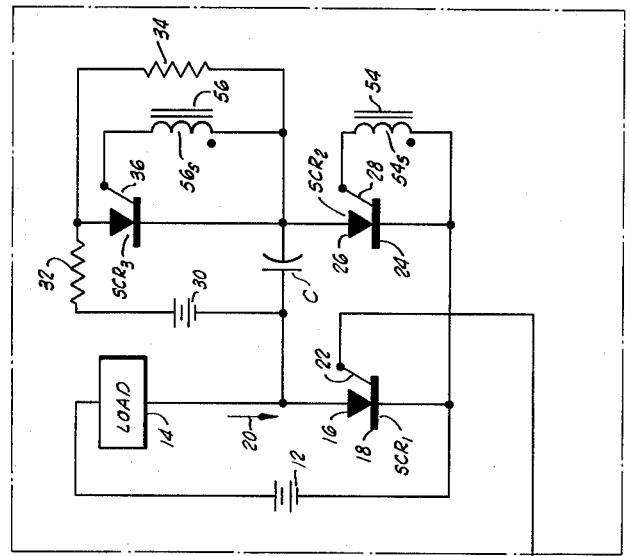
Figure 1:
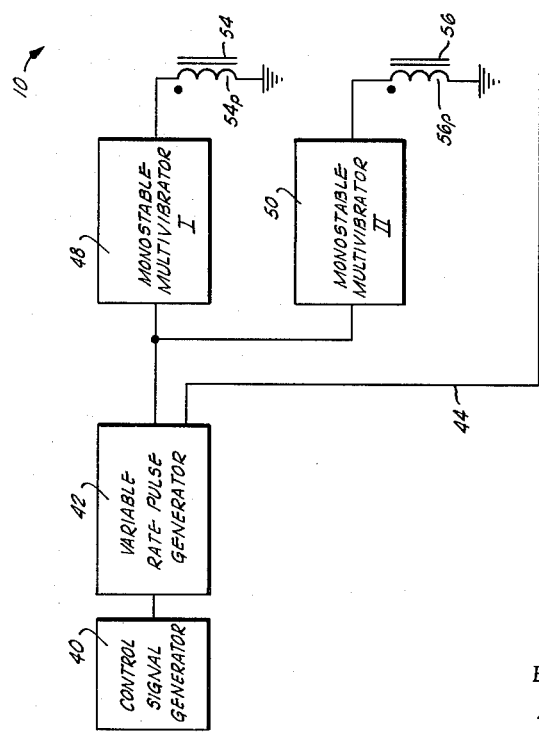

Sept. 28, 1965                J. R. COLE                3,209,174
PULSE GENERATOR HAVING HIGH REPETITION RATE EMPLOYING
THREE SCR'S FOR DRIVING LOW IMPEDANCE LOAD
Filed May 31, 1963                              2 Sheets-Sheet 1

INVENTOR.
JIMMY R. COLE

BY

ATTORNEY

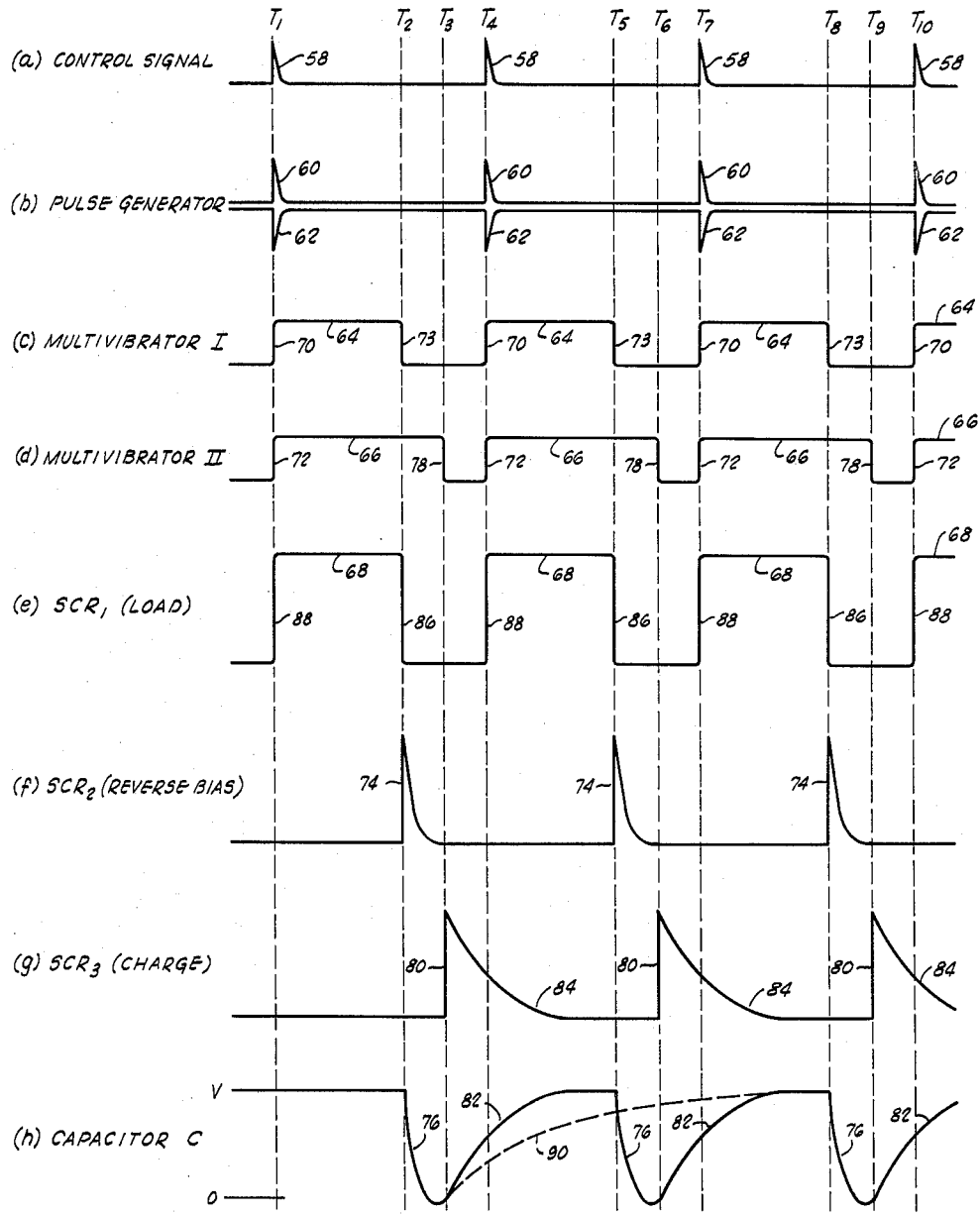

United States Patent Office 3,209,174
Patented Sept. 28, 1965

3,209,174
PULSE GENERATOR HAVING HIGH REPETITION RATE EMPLOYING THREE SCR'S FOR DRIVING LOW IMPEDANCE LOAD
Jimmy R. Cole, Ponca City, Okla., assignor to Continental Oil Company, Ponca City, Okla., a corporation of Delaware
Filed May 31, 1963, Ser. No. 284,598
2 Claims. (Cl. 307—88.5)

The present invention relates to a high-power pulse generator for driving a low impedance load with a pulse of short duration and high repetition rate, and more particularly, but not by way of limitation, relates to a circuit having a controlled rectifier in the power circuit and to an improved circuit means for turning the controlled rectifier "on" and "off" at a greater rate.

In copending U.S. application Serial No. 38,198, now Patent No. 3,136,896, entitled "Pulse Amplifier," filed by Cole et al. on June 23, 1960, and assigned to the assignee of the present invention, a device was described for driving a low impedance load with a pulse of short duration and low repetition rate. The circuit described in the referenced application utilizes a controlled rectifier as a switching device connected in series with the load and a D.C. power source. A second controlled rectifier and a capacitor are connected in opposition to the first controlled rectifier so as to apply a reverse bias to the first controlled rectifier upon discharge of the capacitor, and a battery is connected through a resistor to charge the capacitor. In operation, the first controlled rectifier is triggered "on" and power current is supplied through the load. Then the second controlled rectifier is triggered "on" to discharge the capacitor and reverse bias the first controlled rectifier to "cut-off." After discharge of the capacitor, the current through the second controlled rectifier drops to a sufficiently low value that the second controlled rectifier reverts to "cut-off." Then the battery recharges the capacitor through the resistor to a sufficient voltage to again reverse bias the first controlled rectifier to "cut-off" as required. The circuitry described in the above referenced application necessarily has a relatively slow repetition rate, primarily because of the relatively long period of time required to charge the capacitor through the resistor. This period of time was dictated by the total period required for the capacitor to discharge and the second controlled rectifier to revert to "cut-off" plus the period of time required to charge the capacitor through the resistor. The resistor has to be sufficiently large to limit current flow to a level low enough that the second controlled rectifier will revert to "cut-off." This necessarily dictates a relatively long RC time period for charging the capacitor.

The present invention also features the use of controlled rectifiers for switching purposes. One type of controlled rectifier which is presently available on the commercial market is known as a silicone controlled rectifier and is usually referred to as an SCR. An SCR has what is conventionally termed an anode and a cathode which are connected in the power circuit, and a gate for triggering the SCR "on." The conventional forward direction for current through the SCR is from anode to cathode. The operating characteristics of the SCR are such that the device will, for all practical purposes, block current in both the forward and reverse directions within the forward and reverse breakover and breakdown voltages. When in this blocking state, the SCR is said to be "cut-off" or "off." However, when a positive trigger pulse of relatively low potential is applied to the gate, the SCR will be triggered "on" and will conduct in the forward direction with substantially no impedance when a potential is applied from anode to cathode. The SCR will continue to conduct in the forward direction until the forward potential is reduced substantially to zero by either removing the forward potential or by applying a reverse bias to overcome the forward potential for a short period of time. Additional detailed information concerning the operating characteristics of SCR's may be obtained from Controlled Rectifier Manual, published by General Electric Company in 1960.

The present invention contemplates an improved pulse generator having a high repetition rate. Without intending to limit the invention as defined by the appended claims, the pulse generator constructed in accordance with the present invention comprises a first SCR connected in series with the load and a power source. A second SCR and capacitor connected in series across the anode and cathode of the first SCR, with the second SCR connected in opposition to the first. A battery and third SCR connected in series to opposite terminals of the capacitor to charge the capacitor in a direction such that upon discharge of the capacitor through the second SCR, the first SCR will be reverse biased to "cut-off." A pulse circuit means is also provided for sequentially turning the first SCR "on" to start the power pulse, turning the second SCR "on" to discharge the capacitor and reverse bias the first SCR to "cut-off," thereby terminating the power pulse, and for turning the third SCR "on" after the second SCR has reverted to "cut-off" after discharge of the capacitor in order to rapidly charge the capacitor back to a sufficiently high voltage to again reverse bias the first SCR when required.

Many practical objects and advantages of a high repetition rate pulse amplifier constructed in accordance with the present invention will occur to those skilled in the art from the following detailed description and drawings, wherein:

FIG. 1 is a schematic diagram of a circuit constructed in accordance with the present invention; and, FIGS. 2a–2h are graphical representations of the currents and voltages of the various components of the circuit of FIG. 1, all oriented with respect to a common time scale in order to illustrate the operation of the invention.

Referring now to FIG. 1, a circuit constructed in accordance with the present invention is indicated generally by the reference numeral 10. The circuit 10 comprises a series power circuit which includes a power source, such as a battery 12, a load 14 and a first silicone controlled rectifier $SCR_1$. $SCR_1$ has an anode 16 which is connected to the load 14 and a cathode 18 which is connected to the negative terminal of the power source 12. Therefore, it will be appreciated that current flow through the circuit comprised of the battery 12, load 14 and $SCR_1$ is in the direction of the arrow 20, which is in the forward direction through $SCR_1$. Current in the power circuit is started by applying a positive pulse to the control gate 22 which triggers $SCR_1$ "on," and is stopped by applying a reverse bias to $SCR_1$ through a reverse biasing circuit which will presently be described.

The reverse biasing circuit includes a second silicone controlled rectifier $SCR_2$ and a capacitor C which are connected across $SCR_1$. It will be noted that the cathode 24 of $SCR_2$ is connected directly to the cathode 18 of $SCR_1$ and that the anode 26 of $SCR_2$ is connected through the capacitor C to the anode 16 of $SCR_1$. Thus $SCR_2$ may be considered as connected in opposition to $SCR_1$. $SCR_2$ is triggered "on" by a positive pulse applied to the control gate 28, and when turned "on" will permit discharge of the capacitor C to reverse bias $SCR_1$ to "cut-off" as will hereafter be described in greater detail.

The capacitor C is charged by means of a series charging circuit comprised of a power source, such as a battery 30, a relatively small resistor 32, and a third silicone controlled rectifier $SCR_3$. A large resistor 34 is connected in shunt around $SCR_3$ for maintaining the capacitor C charged, as will hereafter be described in greater detail. $SCR_3$ is triggered "on" by applying a positive pulse to gate 36.

The sequence of operation of the three SCR's described above may be controlled by any suitable circuit means for producing the pulses which will presently be described in detail. However, a preferred circuit means comprises a generator means represented by the box 40 for producing a control signal in the form of a series of pulses 58 which may occur at any variable rate within the capacity of the circuit means 10, as will presently be described, and which are represented graphically in FIG. 2(a) at times $T_1$, $T_4$, $T_7$ and $T_{10}$. The control signal from the generator 40 is fed to a variable rate pulse generator 42 which, in response to each pulse from the generator 40, generates a positive pulse 60 which is fed through conductor 44 to the gate 22 of $SCR_1$ and which triggers $SCR_1$ "on." A negative pulse 62 is also generated by generator 42 in response to each pulse 58 and is simultaneously fed to a first monostable multivibrator I, which is designated by the box 48 in FIG. 1, and to a second monostable multivibrator II, which is represented by the box 50 in FIG. 1. In response to each pulse 62, multivibrator I generates a positive pulse 64, as illustrated in FIG. 2(c), which has a time duration corresponding to the desired time duration of the power pulse to be applied to the load 14. Therefore, the duration of the pulses 64 should be adjustable so as to provide control over the duration of the power pulse, as will hereafter be more evident. The output from multivibrator I is applied to the primary winding $54_p$ of a transformer 54, the secondary winding $54_s$ of which is connected to apply a positive pulse to the control gate 28 of $SCR_2$ during the fall of the positive pulse 64 from the multivibrator I at times $T_2$, $T_5$ and $T_8$. The multivibrator II generates a positive pulse 66 in response to each negative pulse 62 which is slightly longer in duration than the pulse from the multivibrator I. Thus it will be noted that the pulses 66 start at times $T_1$, $T_4$, $T_7$ and $T_{10}$, and fall at times $T_3$, $T_6$ and $T_9$. The pulse from the multivibrator II is passed through the primary winding $56_p$ of the transformer 56. The secondary winding $56_s$ of the transformer 56 is connected to apply a positive pulse to the control gate 36 of $SCR_3$ during the fall of the positive pulse 66 from the multivibrator II at times $T_3$, $T_6$ and $T_9$.

*Operation*

Referring now to FIG. 2(a), the control signal from the generator 40 includes positive pulses 58 at times $T_1$, $T_4$, $T_7$ and $T_{10}$, as previously mentioned. In response to each positive pulse 58, the variable pulse generator 42 simultaneously generates a positive pulse 60 which triggers $SCR_1$ "on" at time $T_1$, as shown by the power pulse 68 in FIG. 2(e), and a negative pulse 62 which is fed to both multivibrators I and II which start pulses 64 and 62 as illustrated in FIGS. 2(c) and 2(d). Current will then be flowing through the power circuit and therefore through the load 14. The rise 70 of the positive pulse 64 from multivibrator I which is applied to the primary winding $54_p$ of the transformer 54 will generate a negative pulse in the secondary winding $54_s$ which will be of no consequence to $SCR_2$. Similarly the rise 72 of the positive pulse 66 from the multivibrator II which is applied to the primary winding $56_p$ of transformer 56 will result in a negative pulse being applied to control gate 36 of $SCR_3$ and be of no consequence. Thus $SCR_1$ will continue to conduct for the duration of the pulse 64 from the multivibrator I.

At time $T_2$ when the pulse 64 from the multivibrator I falls to zero at 73, a positive pulse will be induced in the secondary winding $54_s$ and applied to the control gate 28 of $SCR_2$ thereby triggering $SCR_2$ "on". The capacitor C, which has been charged to the potential of the battery 30 through the small resistor 32 and the large resistor 34 over a period of time, will then discharge through $SCR_2$ and reverse bias $SCR_1$ to "cut-off." Thus the current pulse 68 through $SCR_1$ and therefore through the load 14 corresponds in time duration to the time duration of the positive pulse 64 generated by multivibrator I, as previously mentioned and as can be readily ascertained by comparing FIGS. 2(c) and 2(e). When $SCR_2$ is triggered "on," the current through $SCR_2$ will increase sharply at time $T_2$ as represented by the pulse 74 in FIG. 2(f). At the same time, the potential of the capacitor C will be discharged from a voltage V substantially to zero along a curved path 76, substantially as illustrated in FIG. 2(h), beginning at time $T_2$. The current through $SCR_2$ and the voltage on the capacitor C will decay at approximately the same rate so that when the capacitor C is substantially discharged, the current though $SCR_2$ will fall to a level sufficiently low that $SCR_2$ will revert to "cut-off." This, of course, will require some time period, which will be a function of the size of the capacitor C and the impedance of $SCR_2$ as well as the "cut-off" level of $SCR_2$.

As soon as $SCR_2$ has reverted to "cut-off," it is then desirabe to trigger $SCR_3$ "on" to recharge capacitor C. Therefore, the positive pulse 66 from multivibrator II should have a time duration longer than the pulse 64 from multivibrator I by the period required for the capacitor C to discharge and $SCR_2$ to revert to "cut-off." Then when the pulse 66 from multivibrator II falls along the curve 78 in FIG. 2(d), a positive pulse will be generated in the secondary winding $56_s$ of the transformer 56 and will be applied to the control gate 36 of $SCR_3$ which will then be triggered "on" at time $T_3$ as represented by the rise 80 in the curve of FIG. 2(g). The capacitor C will then be charged at the high rate along the rise 82 of the curve of FIG. 2(h) because of the low impedance of the resistor 32 and of $SCR_3$. When the capacitor C is fully charged to the voltage of the battery 30, the current through $SCR_3$ will drop to a minimum, as illustrated at 84 in FIG 2(g), at which time $SCR_3$ will also revert to "cut-off." The large resistor 34 will maintain the capacitor C charged until $SCR_2$ is again triggered "on" even though slight leakage may occur through $SCR_2$, and will also insure that $SCR_2$ is charged at the beginning of operation. Simultaneously with, or at any time after time $T_3$, another control signal pulse 58 may be generated, for example at time $T_4$, and a repeat cycle will be instigated. Each repeat cycle is identical and therefore corresponding portions of the repeating cycles of the various curves in FIG. 2 are designated by the same reference numerals.

However, it will be noted that the power pulse through the load 14 and $SCR_1$ can be repeated any time after $SCR_2$ has reverted to "cut-off," which is substantially time $T_3$. However, the repeat cycle is illustrated as starting at time $T_4$ in order to better illustrate the limiting factors of the invention, as will presently be described. In either case, the repeat cycle can be started prior to the time when capacitor C is completely recharged and $SCR_3$ has reverted to "cut-off" because $SCR_2$ is "off" and the capacitor C can be charged during the power pulse through the load 14 and $SCR_1$.

From the above description it will be noted that the minimum elapsed time between the power pulses 68 through $SCR_1$, i.e., the period of time between the fall 86 and the rise 88, is limited by the time period required for the capacitor C to discharge along the curve 76 which is essentially between time from $T_2$–$T_3$, $T_5$–$T_6$, and $T_8$–$T_9$. Therefore, the duration of the pulse 66 must exceed the duration of the pulse 64 by at least this period of time, and should not materially exceed this period of time or the maximum repetition rate of power pulse will be reduced. It will also be noted that the maximum rate at which the power pulse can be repeated is limited by the rate at which the capacitor C can be discharged, $SCR_2$ reverted to "cut-off," and capacitor C recharged, which rate is represented by both the curve 76 and the curve 82. Thus the rate of charging the capacitor C becomes the primary deterrent to a rapid repetition rate of the power pulse.

In the low repetition rate pulse generator described in the above reference application, the capacitor C was charged through the large resistor 34. The resistor 34 must be sufficiently large that the current passing through the resistor from the battery 30 will not prevent $SCR_2$ from reverting to "cut-off." Since capacitor C must be fairly large in order to reverse bias $SCR_1$ to "cut-off," the low current through the large resistor would by itself charge capacity along the dotted curve 90, for example, which would obviously greatly extend the period required to recharge capacitor C to a sufficiently high lever to reverse bias $SCR_1$. However, by providing $SCR_3$ in accordance with the present invention, the capacitor C can be recharged at a much faster rate along the curve 82 because resistor 32 need only be sufficiently large to limit the current through $SCR_3$ to a level within its safe operating range, and the impedance of $SCR_3$ when triggered "on" is very low. Thus it will be evident to those skilled in the art that an improved pulse generator having a high repetition rate limited only by the period of time required for capacitor C to discharge, $SCR_2$ to revert to "cut-off," and capacitor C to be recharged through $SCR_3$ has been described.

Another important aspect of the invention is that a high power output can be attained even at the maximum pulse repetition rate because the only lost time is that period required for capacitor C to discharge and $SCR_2$ to revert to "cut-off," which is the curve 76 between $T_2$ and $T_3$. If the pulse generator is to be operated in this manner, only one control pulse is needed because the pulse used to trigger $SCR_1$ "on" to start the power pulse can be used to also trigger $SCR_3$ "on" to start the recharge of capacitor C. However, if it is desired to control both the duration of each power pulse 68 and also the repetition rate, i.e., frequency of the power pulses, the two control signal pulses 64 and 66 are preferred. Then merely by adjusting the duration of the control pulse 64 from multivibrator I the duration of the power pulse can also be controlled. Thus it will be evident to those skilled in the art that a versatile pulse generator having an increased repetition rate and high power capability has been described for driving low impedance loads. Those skilled in the art will also recognize that the pulse generator is a basic electronic device having considerable utility in the art.

Although a particular embodiment has been described in detail, it is to be understood that various changes, substitutions and alterations can be made therein without departing from the spirit and scope of the present invention as defined by the appended claims.

What is claimed is:

1. An improved pulse generator circuit for driving a low impedance load, comprising:

a power circuit comprising a power source and a first controlled rectifier connected in series with the load;

a reverse biasing circuit for reverse biasing the first controlled rectifier to "cut-off" comprising a capacitor and a second controlled rectifier serially connected across the first controlled rectifier with the second controlled rectifier connected in opposition to the first controlled rectifier;

a charging circuit for charging the capacitor of the reverse biasing circuit in a polarity and to a potential for reverse biasing the first controlled rectifier when discharged, the charging circuit comprising a power source and a third controlled rectifier serially connected across the capacitor and a large resistor connected in shunt around the third controlled rectifier; and, control circuit means for sequentially triggering the first controlled rectifier "on," triggering the second controlled rectifier "on" to discharge the capacitor and reverse bias the first controlled rectifier to "cut-off," and after the capacitor has discharged and the second controlled rectifier reverted to "cut-off," triggering the third controlled rectifier "on" to recharge the capacitor.

2. An improved pulse generator circuit for driving a low impedance load as defined in claim 1 wherein the control circuit means comprises:

first circuit means for generating a first control signal having a series of pulses corresponding to the desired repetition rate of the power pulse through the load;

second circuit means operatively connected to the first circuit means and the first controlled rectifier for triggering the first controlled rectifier "on" in response to each pulse of the first control signal;

third circuit means operatively connected to the first circuit means for generating a third control pulse having a rise and a fall separated by a time period corresponding to the desired time duration of the power pulse;

fourth circuit means operatively connected to the third circuit means and the second controlled rectifier for triggering the second controlled rectifier "on" in response to the fall of the third control pulse;

fifth circuit means operatively connected to the first circuit means for generating a fifth control pulse having a rise and a fall separated by a time period greater than the time period of the third control pulse by the time period required for the capacitor to discharge and the second controlled rectifier to revert to "cut-off"; and, sixth circuit means operatively interconnecting the fifth circuit means and the third controlled rectifier for triggering the third controlled rectifier "on" in response to the fall of the fifth control pulse.

No references cited.

ARTHUR GAUSS, *Primary Examiner.*